F. SYMER.
APPARATUS FOR BRAZING SAW BLADES OR THE LIKE.
APPLICATION FILED JUNE 23, 1913.

1,116,162.

Patented Nov. 3, 1914.

Witnesses:
Jacob Oberst Jr.,
Eda M. Schweiger.

Frederick Symer, Inventor.
By Emil Neuhart
Attorney.

F. SYMER.
APPARATUS FOR BRAZING SAW BLADES OR THE LIKE.
APPLICATION FILED JUNE 23, 1913.
1,116,162.
Patented Nov. 3, 1914.
2 SHEETS—SHEET 2.
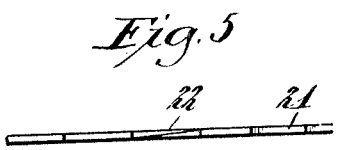
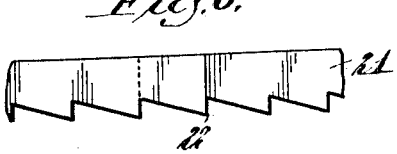
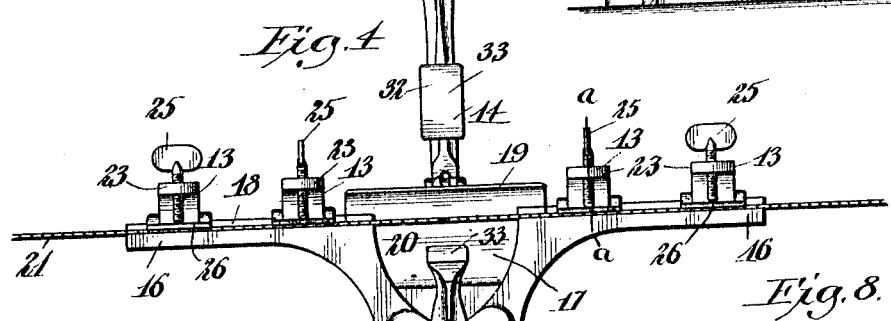
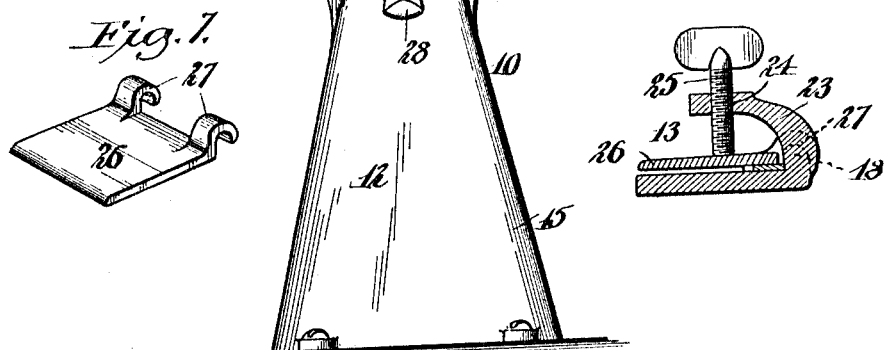
Witnesses:
Jacob Oberst, Jr
Eda M. Schweiger
Frederick Symer, Inventor.
By Emil Neuhart
Attorney.

UNITED STATES PATENT OFFICE.

FREDERICK SYMER, OF BUFFALO, NEW YORK.

APPARATUS FOR BRAZING SAW-BLADES OR THE LIKE.

1,116,162.  Specification of Letters Patent.  Patented Nov. 3, 1914.

Application filed June 23, 1913. Serial No. 775,426.

*To all whom it may concern:*

Be it known that I, FREDERICK SYMER, a citizen of the United States, residing at Buffalo, in the county of Erie and State of New York, have invented certain new and useful Improvements in Apparatuses for Brazing Saw-Blades or the like, of which the following is a specification.

My invention relates to an apparatus for brazing metal bands or strips and especially saw blades or saw bands, the embodiment of my invention herein shown being particularly adapted for the last-mentioned purpose.

My invention has for its object the provision of a simple, durable, and inexpensive apparatus for the purposes mentioned in which the broken ends of a blade or band may be conveniently and properly positioned for brazing and maintained in proper position; in which the heat applied will be localized to the point to be brazed; in which provision is made for applying pressure to the brazed region so as to prevent any increase in thickness at such point over that which the blade or band has at other points; and to otherwise improve on brazing apparatuses for such purposes now in use.

To these ends my invention consists in the novel features of construction and in the arrangement and novel application of parts to be hereinafter described and more particularly pointed out in the subjoined claims.

Figure 1:
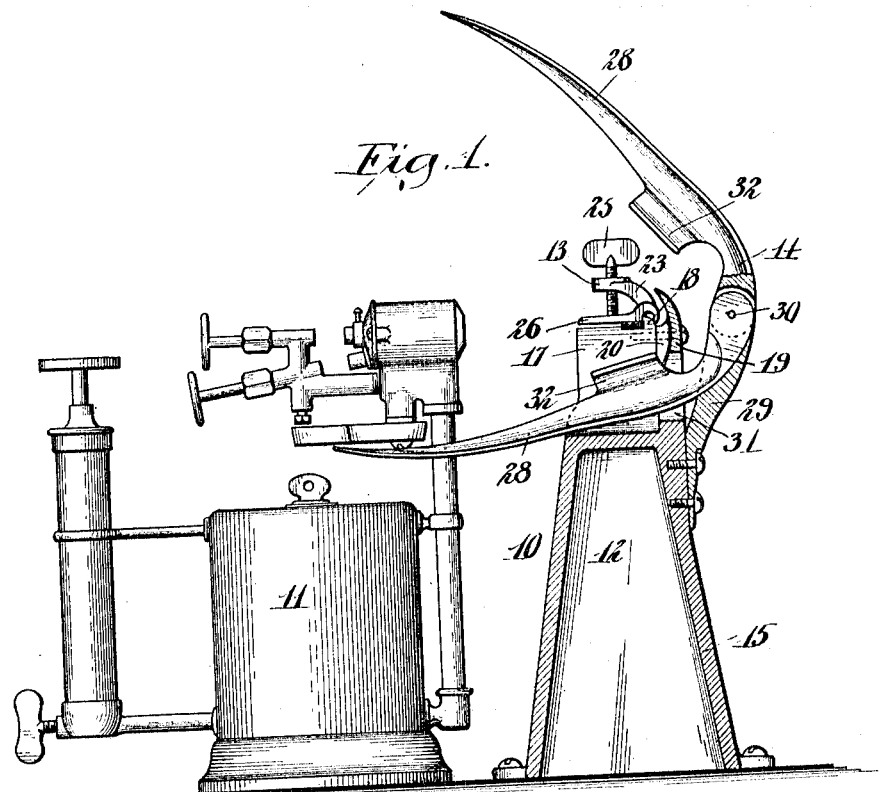
Figure 2:
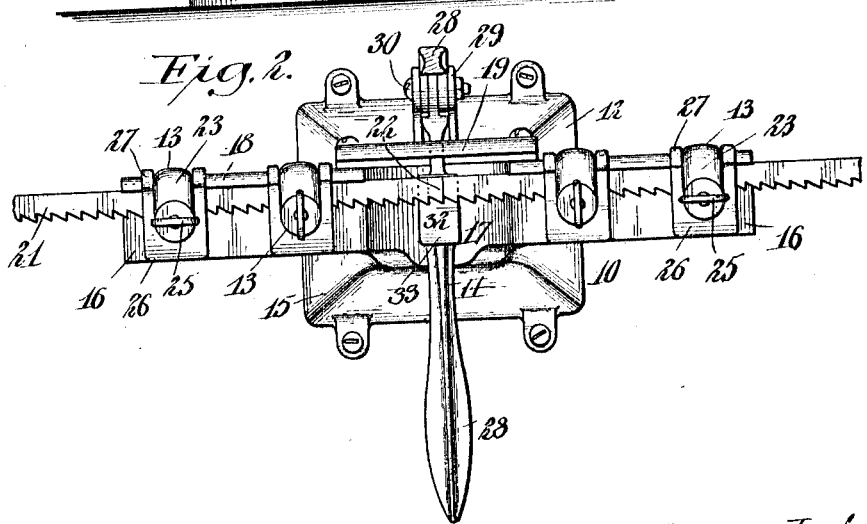

Figure 1 is a central vertical section taken transversely of the device with the members of the pressure device separated and a blast furnace or torch in operative relation thereto. Fig. 2 is a plan view of the apparatus. Fig. 3 is a sectional view of the apparatus similar to Fig. 1 with the members of the pressure device shown in the act of applying pressure to the brazed region of a saw blade or band. Fig. 4 is a front elevation of the apparatus. Fig. 5 is an edge view of a portion of a saw blade or band, showing the manner in which the broken ends are prepared and placed preparatory to brazing. Fig. 6 is a plan view of the same. Fig. 7 is a detached perspective view of one of the clamp plates. Fig. 8 is an enlarged transverse section taken on line *a—a*, Fig. 4 looking to the left.

Referring now to the drawings in detail, in which similar numerals of reference refer to similar parts in the several figures, 10 designates my improved brazing apparatus, considered as a whole, and 11 a blast torch or furnace of any suitable construction for the purpose intended, the torch or furnace herein shown being of the type in which a volatile fluid under pressure is ignited and the flame directed into the brazing region of the brazing apparatus. While this apparatus is intended primarily for home or individual use, it is also adapted for general purposes, and in such cases an oxy-acetylene or other heating device may be utilized in the brazing operation.

The brazing apparatus comprises a body portion or support 12, clamping devices 13, and a pressure device 14. The body portion or support has a pedestal or standard 15 which may be of any desired form and construction, that herein shown being a hollow tapering pedestal having integral oppositely-directed tables 16 with a depression 17 between the tables. The upper faces of the tables are on a level and each has an upstanding flange 18 at its rear marginal portion with the upper edge rounded, as shown in dotted lines, Fig. 8. The front faces of these flanges are in perfect alinement and serve as a straight edge against which the smooth edges of the saw blades or bands are to be placed; thus assuring proper positioning of the broken parts of the blades or bands.

Rising from the pedestal or standard 15 so as to close the depression or space 17 at the rear is a wall 19 which has its upper portion extended laterally to overlap the inner ends of the tables 16 and the front of this wall, which serves as a deflector wall or plate, has a concaved portion 20 directly in rear of the brazing region so that a flame directed into the brazing region and passing rearwardly thereof is deflected forwardly and the heat thus locally applied. The depression or space 17 is inclosed at three sides, namely, at the rear of the deflector wall 19 and at the sides by the inner ends of the tables 16, and this depression or space serves as a heating chamber.

The saw blade or band is designated by the numeral 21 and the broken or other ends to be brazed are preferably oppositely beveled, as at 22, and lapped, as shown, preparatory to brazing. The two separated parts are placed upon the tables 16 in the manner shown, with the ends to be brazed properly positioned at a point centrally between said tables, the smooth edges of the blade or band parts bearing against the straight edges of the upstanding flanges 18. When in this position the parts are clamped by the clamping devices 13.

Upwardly and forwardly directed ears 23 formed integrally with the tables 16 form parts of the clamping devices, each ear having a threaded aperture 24 through which is threaded a thumb screw 25. A pair of said ears are provided for each table 16, one of each pair being near each end of a table. Each of the thumb screws 25 impinges against a clamping plate 26 which is rectangular in form and at its rear marginal portion has a pair of curved lugs 27 which engage the upstanding flange 18 of the table with which said plate is associated. The arrangement of the lugs 27 and flanges 18 assures a secure fastening of the clamping plates 26 when the thumb screws 25 are brought in contact therewith, and by reason of such arrangement and construction the clamping plates can be easily removed. They also accommodate themselves in position to any thickness of saw blade and when positioned bear against the tops of the saw blade or band parts and maintain them in proper position.

The pressure device 14 comprises two pressure levers 28 pivotally secured at one of their ends to an arm or bracket 29 extending upwardly from the pedestal or standard 15 and terminating at a point in rear of the deflector wall or plate 19, a single pivot 30 passing therethrough and being common to both pressure levers. From their pivotal point said levers are oppositely curved and extend forwardly a distance in advance of the body-portion of the apparatus where they terminate in handles to enable their ready manipulation. One lever extends forwardly through an opening 31 in the deflector wall or plate 19 and the other extends forwardly in a plane above the upper edge of said wall or plate. By curving these levers oppositely from their pivotal points they are separated so as to extend, respectively, above and beneath the saw blade or band to be brazed and they are provided with oppositely-directed pressure portions 32 which extend respectively toward the upper and lower faces of the blade or band, each pressure portion having a flat pressure surface 33 which, when the pressure levers are closed upon the saw blade or band, is brought into parallelism and in contact with the blade or band. It is here to be noted that this pressure device is limited to a certain position controlled entirely by the saw blade or band; in other words, the upper end of the opening 31 limits the upward movement of the lower pressure lever and the upper edge of the deflector wall or plate 19 limits the downward movement of the upper pressure lever, thus making it impossible to bend or force the saw blade or band out of alinement.

In the operation of the apparatus, the saw blade or band is clamped to the tables 16 with their broken ends prepared and matched as described. The furnace or torch 11 is then positioned to direct the flame thereof against the joint of the blade or band, to which the flux and spelter or soldering material has been applied, and when properly heated, the pressure levers are brought into contact with the blade or band and the desired pressure applied, which leaves the thickness of the blade or band where brazed, the same as at other points thereof. The blade or band can be readily removed by loosening the thumb-screws 25.

It is of course apparent that in the brazing of the broken blade or other article, the flux and spelter or soldering material may be applied as and when found desirable, and that any heating medium suitable for the purpose may be employed.

Having thus described my invention, what I claim is,—

1. An apparatus for brazing saw blades or the like, comprising a body-portion having oppositely-directed tables separated by an intervening space, each table having an upstanding flange extending along its rear marginal portion and a pair of spaced lugs rising in the plane of said flange and extending forwardly over the table, a pressure screw threaded through the forwardly extending portion of each lug, and a clamping plate coöperating with each lug and comprising a flat portion adapted to bear against a saw placed upon said tables and a pair of curved lugs at the rear of said flat portion, said curved lugs engaging the upstanding flanges of said tables.

2. An apparatus for brazing saw blades and similar articles, comprising a support for the blades having a pair of tables separated by an intervening space, means for clamping the blade to said tables, a wall rising from said support between said tables closing the rear of said intervening space and having an opening therein, and a pair of pressure levers having a common pivot situated in a plane in rear of said wall, one of said levers extending forwardly above said wall and the other extending forwardly through said opening.

3. An apparatus of the kind described, comprising a support for a saw blade or the like, and pressure levers movable toward and from each other and limited in their movement toward each other by a part of said support.

In testimony whereof I affix my signature in presence of two witnesses.

FREDERICK SYMER.

Witnesses:
  EMIL NEUHART,
  JACOB OBERST, Jr.

---

Copies of this patent may be obtained for five cents each, by addressing the "Commissioner of Patents, Washington, D. C."